H. L. STAUFFER.
PIPE VISE POST.
APPLICATION FILED MAR. 28, 1910.
1,054,246.
Patented Feb. 25, 1913.
2 SHEETS—SHEET 1.
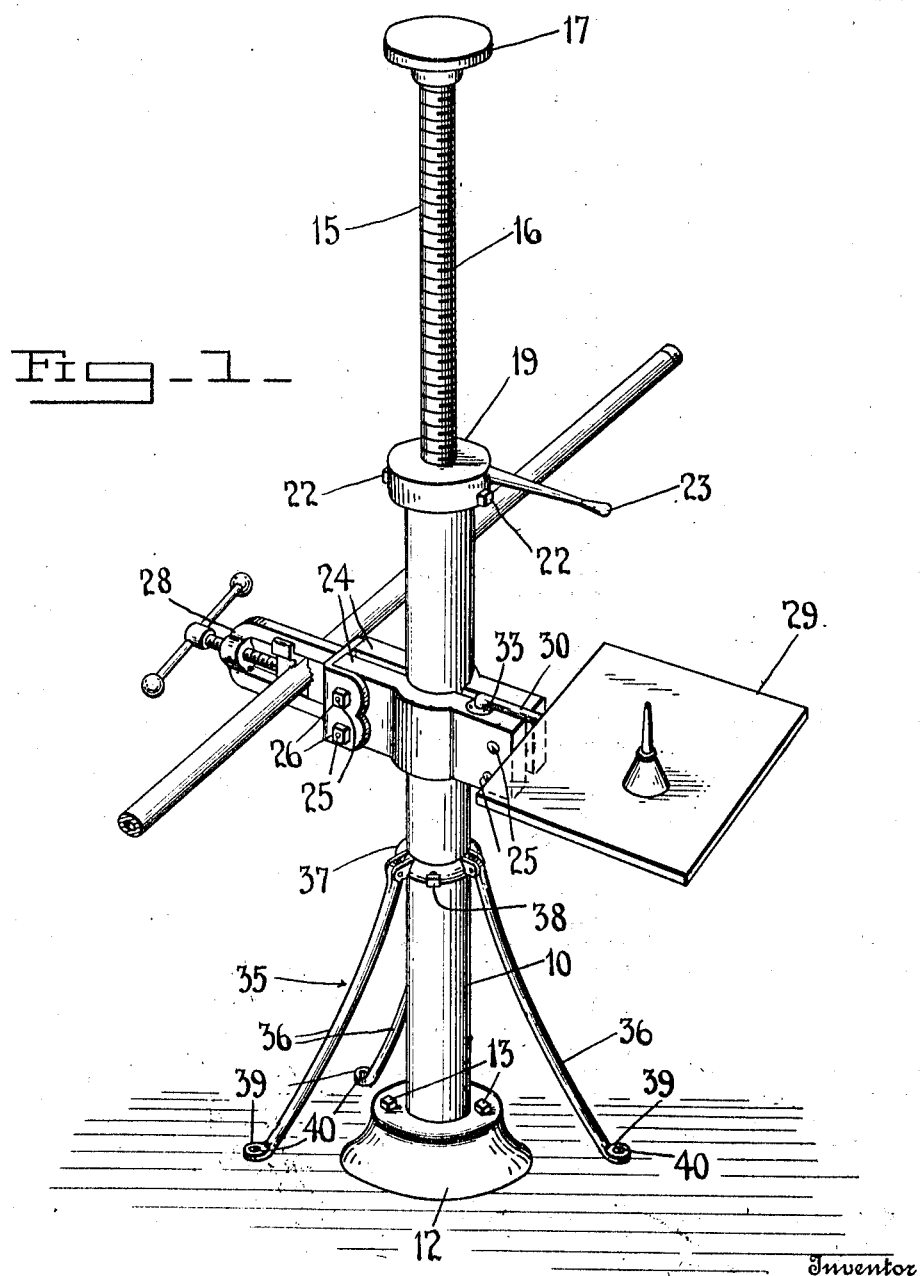
Fig. 1.
Witnesses
L. B. James
Francis Boyle
Inventor
H. L. Stauffer
By 
Attorneys H. L. STAUFFER.
PIPE VISE POST.
APPLICATION FILED MAR. 28, 1910.
1,054,246.
Patented Feb. 25, 1913.
2 SHEETS—SHEET 2.
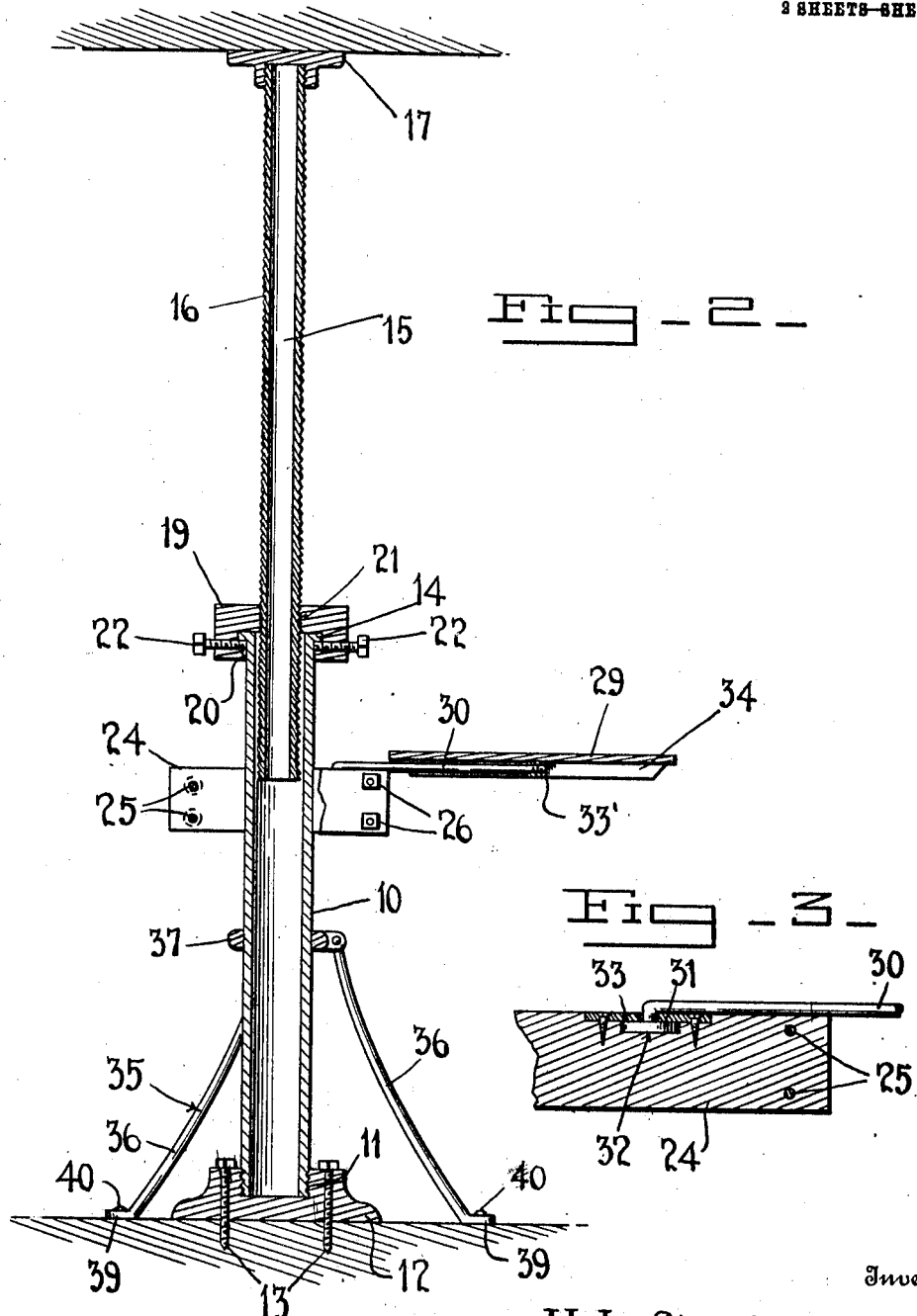
Fig-2-
Fig-3-
Witnesses
L. B. James
Francis Boyle
Inventor
H. L. Stauffer
By Chandler & Chandler
Attorneys

UNITED STATES PATENT OFFICE.

HENRY L. STAUFFER, OF LANSDALE, PENNSYLVANIA.

PIPE-VISE POST.

1,054,246.  Specification of Letters Patent.  Patented Feb. 25, 1913.

Application filed March 28, 1910. Serial No. 551,880.

*To all whom it may concern:*

Be it known that I, HENRY L. STAUFFER, a citizen of the United States, residing at Lansdale, in the county of Montgomery, State of Pennsylvania, have invented certain new and useful Improvements in Pipe Vise Posts; and I do hereby declare the following to be a full, clear, and exact description of the invention, such as will enable others skilled in the art to which it appertains to make and use the same.

This invention relates to supports for steamfitters' pipe vises, and has for an object to provide an extensible post which may readily be set up indoors or outdoors and will prevent the vise from vibrating when in operation.

A further object is to provide a device of this character which will secure the vise at any desired height from the floor.

Hitherto it has been customary for plumbers to procure an ordinary wooden post and after cutting the same to reach from the floor to the joist of the cellar in which they were working, to lose a great deal of time erecting the post and giving it the firmness necessary to hold the pipe vise from vibrating when cutting a thread on the pipe. This invention provides a metal post which can be adjusted to reach from the floor to the joist without loss of time.

In the accompanying drawing forming part of this specification, Figure 1 is a perspective view of the device applied. Fig. 2 is a longitudinal section view through the device. Fig. 3 is a cross section taken on the line 3—3, Fig. 2.

The reference character 10 designates a metal pipe having at one end external screw threads 11 which engage the internal screw threads of a flange 12, this flange being provided with suitable openings to receive screws 13 the lower ends of which project beyond the bottom face of the flange 12 and penetrate the floor upon which the flange rests. The opposite end of the pipe 10 is provided with a peripheral flange 14 the purpose of which will presently appear.

Loosely fitted in the pipe 10 is a pipe 15 of less diameter than the pipe 10 and provided with external screw threads 16 which extend from one end of the pipe to within a short distance of the opposite end of the pipe as shown. A flange 17 similar in construction to the beforementioned flange 12 is threaded upon the upper end of the pipe 15 and is adapted to bear with its flat face upon the ceiling joist 18.

A collar 19 is provided in its bottom face with a circular rabbet 20 of sufficient size to loosely receive the before-mentioned flange 14 of the pipe 10 and is provided with a threaded opening 21 which leads through this rabbet to the top face of the collar and receives the externally threaded pipe. The collar 19 is provided with radial openings through which set screws 22 are inserted the terminals of these set screws engaging the outer face of the pipe 10 and the bottom face of the flange 14 of this pipe. This construction permits of the collar 19 being rotated upon the pipe 10. A rod 23 projects through the periphery of the collar 19 and serves as a handle for rotating the collar. It is now clear that by rotating the collar 19 the flange 17 may be advanced into engagement with the ceiling joist of a room.

Fitted on the opposite sides of the pipe 10 are a pair of blocks 24. These blocks are preferably rectangular in cross section and are provided on their inner faces with semicircular rabbets which receive the sides of the pipe. A pair of bolts 25 are passed transversely through the blocks on each side of the pipe 10 and are provided with retaining nuts 26 which engage the outer face of one of the blocks when tightened and serve to hold the blocks tightly clamped to the pipe. It is evident that these retaining nuts may be loosened and the blocks raised or lowered upon the pipe as desired. One pair of the bolts 25 is sufficient in length to extend considerably beyond the outer face of one of the blocks so that the bolts may be inserted through the bolt openings 27 formed in one leg of the angle iron base of an ordinary pipe vise 28 to secure the pipe vise to the side of the block as shown. The retaining nuts 26 of the bolts 25 bear against the metal leg of the vise and thereby, mutilation of the outer face of the block is prevented. A pipe may be engaged between the jaws of this pipe vise and threaded in the usual manner, the free end of the pipe being supported upon a scaffolding of any preferred form during the operation. By adjusting the blocks 24 upon the pipe 10 the vise may be raised or lowered upon the pipe to a position to accommodate workmen of different heights.

A table top 29 is swiveled upon the blocks 24 and serves as a support for the workman's tools. The preferred manner of connecting the table top to the blocks is as follows: A rod 30 is bent at one extremity at substantially right angles to the main body of the rod and terminates in a suitable head 31 which is loosely engaged in a rabbet 32 formed in the top face of one of the blocks. A washer 33 is mounted on the bent portion of the rod and is bolted or otherwise rigidly secured to the top face of the block and retains the swivel head of the rod in position. The free end of the rod is bolted or otherwise rigidly secured to a cross brace 33 secured to the bottom face of the table top, this cross brace being disposed with its ends in abutting contact with a pair of parallel longitudinal braces 34 disposed upon the bottom face of the table top.

For retaining the device in operative position out of doors a tripod 35 is provided, this tripod consisting of legs 36 connected at their upper ends by an annular collar 37 through which set screws 38 are passed to removably secure the collar to the pipe 10 and provided at their lower ends with expanded portions 39 having suitable openings to permit pegs 40 being inserted therethrough and driven into the ground, or in lieu of the pegs screws or bolts may be employed as desired.

From the foregoing description taken in connection with the accompanying drawing, it is thought the construction and operation of my invention will be easily understood, without a more extended explanation, it being understood that various changes in the form, proportion and minor details of construction may be made within the scope of the appended claim.

What is claimed is:—

A pipe vise post comprising a lower tubular member having an externally flanged upper end, a base for the lower end of said member, an upper tubular member externally threaded and having its lower end freely movable in the lower tubular member, an engaging head on the upper end of the upper member, a collar having a threaded bore engaged on the upper tubular member and an enlarged circular rabbet portion in its bottom rotatably mounted on the flanged end, means for rotating the collar to raise or lower the upper member and set screws operating through the collar and engaging the lower tubular member beneath the flange to hold the collar against displacement and against rotation if desired.

In testimony whereof, I affix my signature, in presence of two witnesses.

HENRY E. STAUFFER.

Witnesses:
CHARLES F. KULP,
DANIEL S. SCHULTZ.